Sept. 21, 1926.

K. E. PEILER

APPARATUS FOR DISCHARGING MOLTEN GLASS

Filed May 5, 1921

Inventor
Karl E. Peiler
by: *W H Honiss* Atty.

Patented Sept. 21, 1926.

1,600,962

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR DISCHARGING MOLTEN GLASS.

Application filed May 5, 1921. Serial No. 467,177.

This invention relates to apparatus for feeding separated mold charges of molten glass to glassware shaping machines, and more particularly to the construction of the orifice or outlet through which the molten glass is discharged from a glass furnace or other container.

When molten glass is discharged from container outlets heretofore employed, the heat of the glass is rapidly abstracted by its contact with the colder walls and edges of the outlet, which also radiate the heat into the surrounding air. This chills the surface of the issuing glass and forms a heavy and more or less uneven skin on the glass that is liable to cause imperfections or defects in glassware made from the discharging glass. The heavier this skin is, the greater is the liability of defects. If a stopper is lowered over such a discharge outlet from above to shut off the flow of glass, the glass beneath the stopper and remaining in and adhering to the outlet gradually cools and hardens so that difficulty is experienced in raising the stopper and in starting the flow again. If an implement or plunger which is immersed in the glass above the outlet is operated periodically to intermit, retract or retard the discharge of glass, for feeding "gob charges," its operation is likely to be hampered or interfered with by reason of the colder and stiffer glass formed at its lower end.

The object of the present invention is to minimize these difficulties by providing heat insulating means surrounding the discharge outlet, which reduces the heat loss of the discharging glass to the walls and edges of the outlet, and minimizes congealing immediately above the outlet. Another object is to provide such an outlet in the form of a removable spout or nozzle which may be readily replaced and easily insulated.

Referring to the drawings:—

Figure 1:
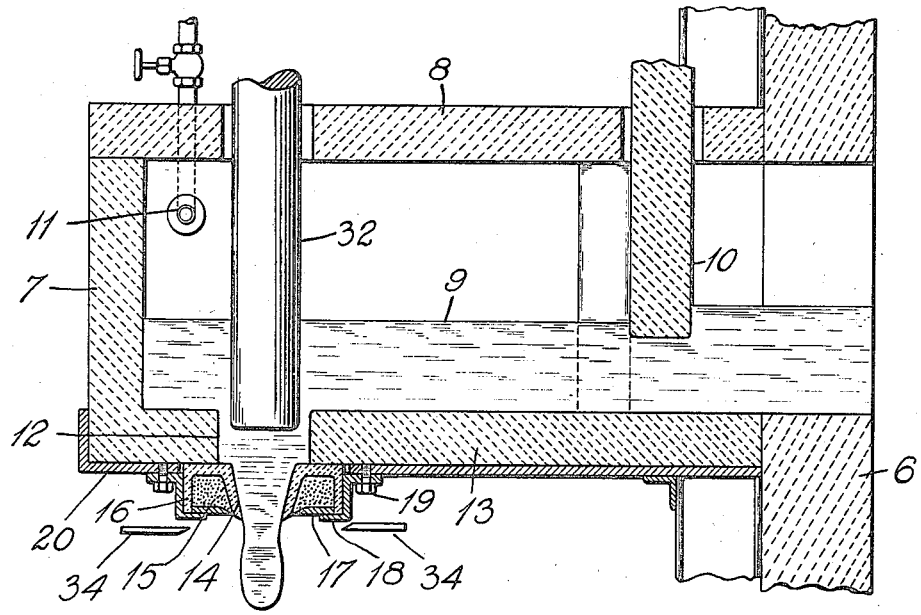
Figure 1 is a vertical section through the forehearth and discharge orifice of a glass furnace.
Figure 2:
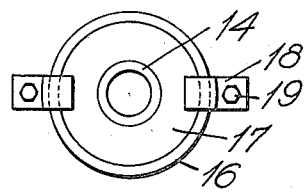
Fig. 2 is a bottom of the orifice ring projected from Fig. 1.

The front wall 6 of a glass furnace (Fig. 1) is provided with a forehearth 7 having a cover 8, all of the usual well-known construction. The flow of molten glass 9 to the forehearth may be regulated by a vertical movable gate 10, and a gas burner 11 may be provided to heat the glass in the forehearth. In the particular type of forehearth selected for the purpose of illustration, the glass is discharged through a submerged opening 12 in the bottom 13 of the forehearth. It is desirable that the size of the outlet through which the glass is discharged, shall be capable of being changed to suit the ware being produced. Moreover, if the final outlet for the glass is through an orifice in the refractory bottom of the forehearth, it becomes irregular in shape with use, due to erosion and the disintegration of the outlet walls by the action of the glass and renewal of the outlet is necessary. Therefore the final discharge outlet is through a ring, preferably made of burnt clay, or other refractory material, which may be inserted in the opening 12 as a bushing or attached to the bottom wall 13 of the forehearth to form an extension to the opening 12.

In the embodiment of the invention shown in Fig. 1, the outlet ring is removably attached to the lower surface of the bottom 13 of the forehearth. The ring comprises a central tubular member or nozzle 14 and in order to make it conveniently removable as well as to conserve the heat which would otherwise be dissipated through the walls of the tube, the ring, including its insulating material 15, is made as a unitary structure. The tubular member 14 is provided with an integral cylinder 16 which forms a channel for receiving the insulation, extending around the whole or a large part of the outlet. Various insulating materials may be used for filling the annular channel of the ring, but solid material, that is, non-fluid material, such as powdered kieselguhr has been found to be well adapted for the purpose. The insulation 15 is retained in place in the channel by a disc 17 secured in position, as shown or in any other suitable manner.

The orifice ring is removably secured in place below the opening 12, by straps 18 secured by screws 19 to a plate 20 supporting the forehearth. The straps 18 also serve to secure the disc 17 in place. By this construction, a heat conserving nozzle is provided which may be replaced readily when necessary.

Figure 3:
Fig. 3 is a section through a modified form of outlet ring.

In Fig. 3 an orifice ring is shown which may be cast in one piece, thus eliminating the use of the disc 17 for covering the insulating material 23. The insulation is introduced through an opening which is afterwards closed by a plug 24. This ring may be attached to the forehearth by the straps 18 and screws 19 in the same way as that shown in Fig. 1.

Figure 4:
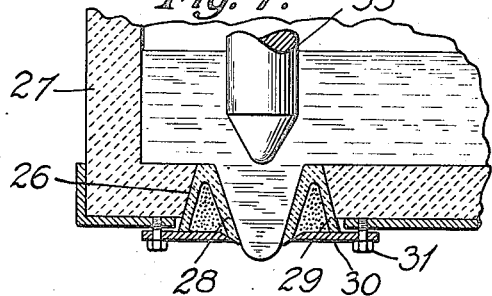
Fig. 4 is a partial section similar to Fig. 1, showing a variation in the form of the orifice ring.
Figure 5:
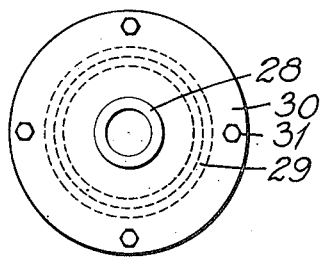
Fig. 5 is a bottom view of the outlet ring projected from Fig. 4.

The form of the invention shown in Figs. 4 and 5 is adapted to be inserted, as a bushing or lining, in an opening 26 of a forehearth 27. In order to facilitate such insertion, the nozzle 28 and insulation retaining member 29 are both conical thus forming a V groove therebetween. A perforated cover 30 is provided to hold the insulation in place, and by making the cover of sufficient diameter, it provides means for securing the ring in place by screws 31.

The various forms of the orifice ring shown in the drawings are adapted to cooperate with a plunger 32 (Fig. 1) or 33 (Fig. 4), movable toward and from the orifice to interrupt the discharge of glass. This movement may be manually controlled to regulate the discharge of glass in a steady stream, or it may be periodically actuated by automatic mechanism to control the accumulation and suspension of compact masses of glass. Shears 34 may be provided to sever mold charges from the suspended masses, or to sever a continuously flowing stream, as is usual in the glass art. The invention may also be employed to advantage in glass feeding apparatus where the discharge is not controlled by a rigid plunger, such for instance, as the device shown in the patent to Hitchcock, Reissue 13,929, in which the discharge is stopped and the stub remaining after severing is retracted by pneumatic means. The separated mold charges may be dropped directly into the molds of a shaping machine or be conveyed thereto in any suitable manner.

It is to be understood that, while the invention has been illustrated as a submerged orifice and in connection with a movable plunger or stopper, this location and association of parts is not essential to the invention in its broader aspect which is limited only by the following claims.

What is claimed as new is:—

1. In apparatus for separating molten glass into mold charges, a container for the glass provided with a refractory discharge nozzle and an insulating jacket around and extending approximately to the discharge end of the nozzle to conserve the heat of the discharging glass.

2. In combination with the outlet of a container for molten glass, an outlet ring comprising in a self-contained structure, a refractory discharge nozzle and a jacket of heat insulating material.

3. In combination with the outlet of a container for molten glass, an outlet ring comprising a refractory discharge nozzle provided with a seat for receiving and partially enclosing a jacket, and having a jacket of heat insulating material supported in said seat.

4. In combination with the outlet of a container for molten glass, an outlet ring comprising a refractory discharge nozzle provided with a surrounding casing, and having heat insulating material supported in said casing.

5. In an apparatus for separating molten glass into mold charges, the combination with a container for the glass, of a removable refractory discharge nozzle, an annular layer of heat insulating material surrounding and extending approximately to the discharge end of the nozzle, and removable means to retain the insulating material in place around the nozzle to conserve the heat of the discharging glass.

6. In apparatus for separating molten glass into mold charges, the combination with a container for the glass, of an outlet ring comprising an inner tubular portion through which the glass is discharged, an outer retaining portion, and an intermediate insulating portion to conserve the heat of the discharging glass.

7. In apparatus for separating molten glass into mold charges, a container for the glass having a discharge nozzle, a heat insulating jacket around the nozzle and a wall formed integral with the nozzle to retain the jacket.

8. In apparatus for separating molten glass into mold charges, a container for the glass provided with a well in its bottom, a removable discharge nozzle registering with the well, and insulation around the nozzle to conserve the heat of the glass.

9. In combination with the outlet of a container for molten glass, an outlet ring comprising a refractory discharge nozzle provided with a surrounding casing, and having loose solid insulating material enclosed in said casing.

10. In apparatus for separating molten glass into mold charges, a container for the glass provided with a well or depression in its bottom, a discharge controlling implement co-acting with said well or depression, and an insulating member forming the bottom of the well, said insulating member comprising a discharge nozzle surrounded by heat insulating material to prevent the chilling of the glass below the implement.

11. In apparatus for separating molten glass into mold charges, the combination with a container for the glass, of a discharge nozzle, an implement movable vertically over the nozzle to control the discharge therethrough, and an insulating jacket around and extending approximately to the discharge end of the nozzle to assist in maintaining the fluidity of the glass between the implement and the nozzle.

12. As a new article of manufacture an outlet ring for molten glass containers, consisting of a nozzle, and a heat insulating jacket combined therewith as a unitary structure, and adapted to be attached to a container outlet.

13. In apparatus for feeding molten glass, a container for the glass provided with a frusto conical refractory discharge nozzle, and an insulating jacket around and extending approximately to the discharge end of the nozzle to conserve the heat of the glass passing through said nozzle.

14. In combination with the discharge outlet of a container for molten glass, an outlet ring unit comprising a refractory discharge nozzle, and an annular jacket of heat insulating material surrounding the nozzle, said jacket varying in cross sectional area throughout the longitudinal dimension of said nozzle.

15. In apparatus for feeding molten glass, a container for the glass having a refractory discharge nozzle, and an annular jacket of heat insulating material surrounding the nozzle, the cross sectional area of said insulating material uniformly increasing from the inlet to the discharge portion of said nozzle, whereby a uniform temperature of the glass is maintained during its passage through the nozzle.

Signed at Hartford, Conn., this 4th day of May, 1921.

KARL E. PEILER.